United States Patent Office 3,298,937
Patented Jan. 17, 1967

3,298,937
ELECTROPLATING BATHS AND PROCESSES
Wennemar Strauss and Wolf-Dieter Willmund, Dusseldorf-Holthausen, and Alfred Kirstahler, Dusseldorf, Germany, assignors to Dehydag Deutsche Hydrierwerke G.m.b.H., Dusseldorf, Germany, a corporation of Germany
No Drawing. Filed Dec. 26, 1963, Ser. No. 333,724
Claims priority, application Germany, Jan. 12, 1963, D 40,675; Jan. 19, 1963, D 40,723; Apr. 24, 1963, D 41,416
86 Claims. (Cl. 204—44)

This invention relates to an electroplating method and bath.

It has been found that electroplating baths which furnished high quality metal electrodeposits are obtained by adding to customary electroplating baths derivatives of acid, sulfur-containing phosphorus derivatives which comprise organic radicals linked through oxygen, sulfur, nitrogen or phosphorus.

These compounds are derived from thiophosphoric acids, such as thionophosphoric acid, thiolothionophosphoric acid, dithiolothionophosphoric acid or tetrathiophosphoric acid, from thiophosphonic acids, such as thionophosphonic acid, thiolothionophosphonic acid, trithiophosphonic acid such as thionophosphinic acid, dithiophosphinic acid, or esters, thioesters or amides of these or similar acids.

These compounds have the following structural basis $$-R-X-\overset{\overset{S}{\|}}{P}\overset{Y-}{\underset{Z-}{}}$$

wherein R is a member selected from the group consisting of aliphatic, cycloaliphatic, aromatic and araliphatic radicals, X, Y and Z are heteroatom groups selected from the group consisting of O, S and NH, and the like.

The compounds of the invention falling under the above formula form three general groups, depending on the substituents linked to the open valences.

In group I are compounds having the general formula $$R-(X)_n-\overset{\overset{S}{\|}}{P}\overset{(Y)_n-M}{\underset{(Z)_n-M}{}}$$

In this general formula R stands for an aliphatic, cycloaliphatic, aromatic, and araliphatic radical which may also be substituted or interrupted by heteroatoms or heteroatom groups. X, Y and Z represent heteroatoms or heteroatom groups, such as oxygen, sulfur, NH, and the like, and M represents hydrogen, metals or organic bases. The linking members X and/or Y and/or Z may also be omitted as indicated by $n$ which is a number from 0 to 1.

The products of Group I used in accordance with the present invention are known or they can be prepared by known processes, such as those described in German published application 1,025,086, in Chemical Abstracts, 41, columns 2012–2014 (1947), in Journal of Organic Chemistry, 25 (1960), pp. 1993–1996, and in Berichten der Deutschen Chemischen Gesellschaft, 31 (1898), pp. 1094–1111 and 41 (1908), p. 3854.

A few examples of the derivatives of acid sulfur-containing phosphorus derivatives of Group I which are used in accordance with the present invention in the customary electroplating baths are given below.

(1) The disodium salt of O-butyl-thionophosphoric acid $$C_4H_9-O-\overset{\overset{S}{\|}}{P}\overset{ONa}{\underset{ONa}{}}$$

(2) The disodium salt of S-octyl-thiolothionophosphoric acid $$C_8H_{17}-S-\overset{\overset{S}{\|}}{P}\overset{ONa}{\underset{ONa}{}}$$

(3) The disodium salt of O-ethyl-dithiolothionophosphoric acid $$C_2H_5-O-\overset{\overset{S}{\|}}{P}\overset{SNa}{\underset{SNa}{}}$$

(4) The diammonium salt of S-benzyl-tetrathiophosphoric acid $$\text{C}_6\text{H}_5-CH_2-S-\overset{\overset{S}{\|}}{P}\overset{SNH_4}{\underset{SNH_4}{}}$$

(5) The O-phenyl-thionophosphoric acid diamide $$\text{C}_6\text{H}_5-O-\overset{\overset{S}{\|}}{P}\overset{NH_2}{\underset{NH_2}{}}$$

(6) The sodium salt of O-phenyl-thionophosphoric acid monoamides $$\text{C}_6\text{H}_5-O-\overset{\overset{S}{\|}}{P}\overset{NH_2}{\underset{ONa}{}}$$

(7) The disodium salt of phenyl-thionophosphonic acid $$\text{C}_6\text{H}_5-\overset{\overset{S}{\|}}{P}\overset{ONa}{\underset{ONa}{}}$$

(8) The disodium salt of phenyl-trithio-phosphonic acid $$\text{C}_6\text{H}_5-\overset{\overset{S}{\|}}{P}\overset{SNa}{\underset{SNa}{}}$$

(9) The phenyl-thionophosphonic acid diamide $$\text{C}_6\text{H}_5-\overset{\overset{S}{\|}}{P}\overset{NH_2}{\underset{NH_2}{}}$$

(10) The N,N-pentamethylene amido-thionophosphoric acid diamide $$\text{C}_5\text{H}_{10}N-\overset{\overset{S}{\|}}{P}\overset{NH_2}{\underset{NH_2}{}}$$

(11) The O-phenyl-thionophosphoric acid dimorpholide $$\text{C}_6\text{H}_5-O-\overset{\overset{S}{\|}}{P}\overset{N(C_4H_8O)}{\underset{N(C_4H_8O)}{}}$$

Compounds of Group II have the general formula $$R-(X)_n-\overset{\overset{S}{\|}}{P}\overset{(Y)_n-R'-L}{\underset{(Z)_n-R''-L}{}}$$

In this general formula, R, R' and R'' stand for aliphatic, cycloaliphatic, aromatic and araliphatic radicals which may also be substituted or interrupted by heteroatoms or heteroatom groups, X, Y and Z stand for heteroatoms or heteroatom groups such as O, S, NH and the like, and L stands for a water-solubilizing inorganic or organic group. X and/or Y and/or Z may also be omitted as indicated by $n$ which is a number from 0 to 1. Suitable water-solubilizing groups are anionic, cationic and electroneutral groups, such as COOH, SO$_3$H, SO$_4$H, PO$_2$H, PO$_3$H$_2$, PO$_4$H$_2$, water-solubilizing basic radicals, such as primary, secondary, or tertiary amino groups neutralized with acids, quaternary ammonium groups, polyalkyleneglycol radicals, sugar radicals, etc. The Group II compounds have a greater brightening activity than those of Group I.

These Group II products are known or can be produced in analogous fashion to known processes, such as those described in German Patent 958,548, United States Patent 2,959,608, French Patent 1,234,879, Swedish patent application 5736–58z and Journal of Applied Chemistry (U.S.S.R.) 25 (87) pp. 2274–2277 (November 1955) (abstracted in Centralblatt, 1957, p. 84).

Examples of such derivatives of acid, sulfur-containing phosphorus derivatives of Group II, which are used in accordance with the invention in customary electroplating baths, especially copper, nickel, zinc and cadmium baths, are the following:

(12) Disodium salt of O-butyl-thionophosphoric acid bis-(sulfo-propylesters)

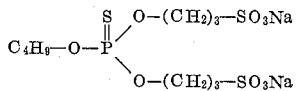

(13) Disodium salt of O-nonylphenyl-thionophosphoric acid bis-(sulfo-propylesters)

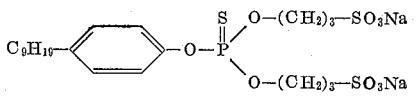

(14) Dipotassium salt of phenyl-thionophosphonic acid bis-(sulfo-propylesters)

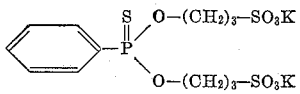

(15) Disodium salt of S-phenyl-thiolothionophosphoric acid bis-(sulfo-propylesters)

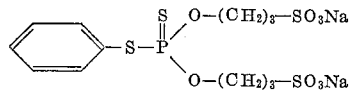

(16) Disodium salt of O-phenyl-dithiolothionophosphoric acid bis-(sulfo-propylesters)

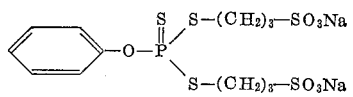

(17) Disodium salt of S-benzyl-tetrathiophosphoric acid bis-(sulfo-propylesters)

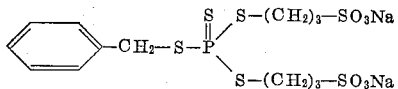

(18) Disodium salt of phenylthionophosphonic acid bis-(carboxy-methylesters)

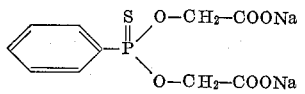

(19) Disodium salt of the sulfates of the addition products of 3 mols of ethyleneoxide to 1 mol of p-chlorophenylthionophosphoric acid

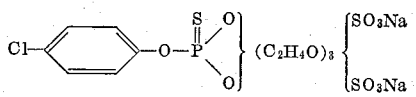

(20) O-phenyl-thionophosphoric acid-bis-((2-hydroxy)-propylester-3-pyridiniumchloride)

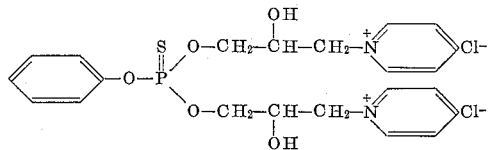

(21) The addition product of 3 mols of ethyleneoxide to 1 mol of phenylthionophosphoric acid

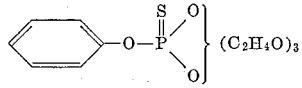

(22) O-phenyl-thionophosphoric acid-bis-(benzylester-o-sodiumsulfonate)

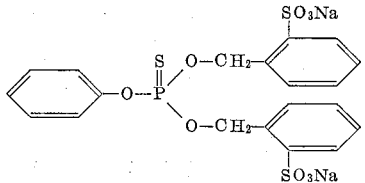

(23) Bis - (sodium-sulfopropyl) - thionophosphinic acid phenylester

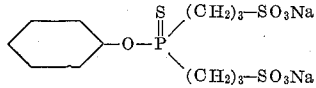

(24) Tetrasodium salt of O-phenyl-thionophosphoric acid-bis-(methylesterphosphoric acid)

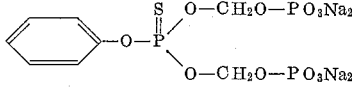

(25) Bis - (sodium-sulfopropyl) - dithiophosphinic acid phenylester

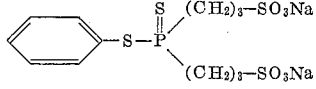

(26) O - phenyl-thionophosphoric acid-di-ω-aminoethyl-esterhydrochloride

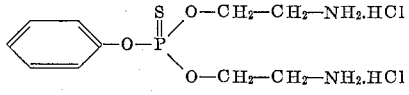

(27) Bis-(sodium-sulfopropyl)-phenyl-phosphinic sulfide

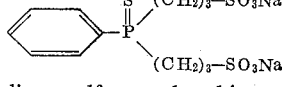

(28) ω - Disodium sulfopropyl - thionophosphoric acid anilide

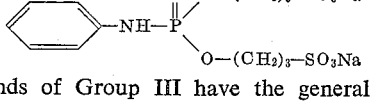

Compounds of Group III have the general formula

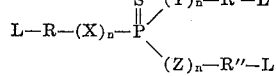

In this formula R, R' and R" stand for aliphatic, cycloaliphatic, aromatic and araliphatic radicals which may also be substituted or may be interrupted by heteroatoms or heteroatom groups, X, Y and Z stand for heteroatoms or heteroatom groups such as O, S and NH, and L represents a water-solubilizing inorganic or organic group. X and/or Y and/or Z may also be omitted as shown by $n$ which is a number from 0 to 1. Suitable water-solubilizing groups are anionic, cationic and electroneutral groups, such as COOH, SO₃H, SO₄H, PO₂H, PO₃H₂, PO₄H₂, water-solubilizing basic radicals, such as primary, secondary or tertiary amino groups neutralized with acids, quaternary ammonium groups, polyalkyleneglycol radicals, sugar radicals, etc.

In these compounds of Group III, all of the organic radicals attached through a heteroatom to the phosphorus atom comprise water-solubilizing inorganic or organic groups. Such compounds are produced similarly to those of Group II as described above.

Examples of such derivatives of acid sulfur-containing phosphorus derivatives of Group III which are used in accordance with the present invention in customary electroplating baths, especially in copper, nickel, zinc and cadmium baths, are the following:

(29) Thionophosphoric acid tris-(propylester-ω-sodium-sulfonate)

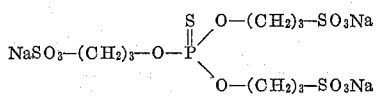

(30) Thionophosphoric acid tris-((2 - hydroxy) - propylester-ω-sodium-sulfonate)

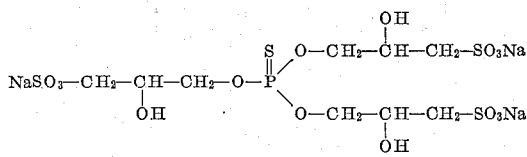

(31) Thionophosphoric acid tris-(benzylester - p - sodium-sulfonate)

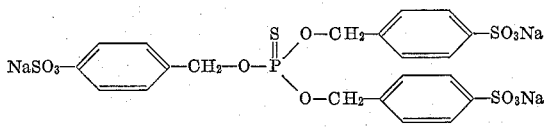

(32) Thionophosphoric acid tris - (benzylester - o-sodium-sulfonate)

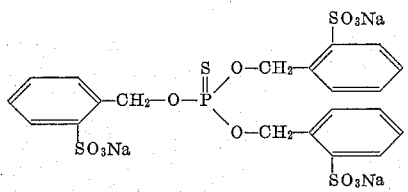

(33) Thionophosphoric acid tris - (ethylester-ω-sodium-sulfonate)

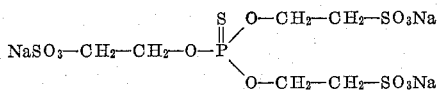

(34) Tetrathiophosphoric acid tris - (propylester - ω-sodium-sulfonate)

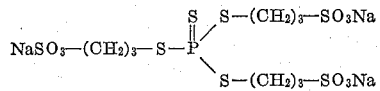

(35) Thionophosphoric acid tris - (methylester - potassium-carboxylate)

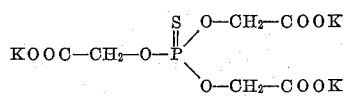

(36) Thionophosphoric acid tris - (ω - sodium sulfopropylamide)

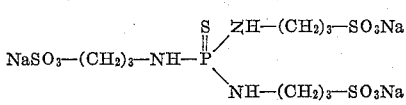

(37) Tris - (ω - sodium - sulfopropyl)-phosphinic sulfide

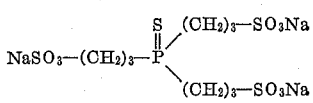

In contrast to the previous customary agents, the agents according to the present invention may be used as brightening additives in all types of metal electroplating baths, that is, for example in acid or cyanide baths of the metals or metal alloys copper, brass, bronze, zinc, cadmium, sliver, nickel, etc. It was surprising that the sulfur-containing organic phosphorus derivatives according to the present invention are not only effective in individual cases in certain metal baths, but rather that they produce brightening effects in practically all of the known metal electroplating baths; it was the more surprising because it was previously known of sulfur-free phosphorous compounds, such as organic phosphoric acid esters or phosphonates, that they exhibit only minor electroplating activities which, at best, can be considered as a finer-grain effect.

Many of the products used in accordance with the present invention not only exhibit brightening properties but also strong leveling effects, whereby they have proved to be particularly suitable for metal electrodeposition.

The amounts in which the agents according to the present invention are added to the baths lie at about 0.001 to 20 gm./l. of bath fluid; in general, the baths are operated at temperatures which are customary for the various types of baths and at current densities which lie between about 0.25 and 8 amp/dm.² and possibly even higher. The current density range of optimum brightening effect is different for the individual compounds and depends upon the composition of the bath, but in many cases it is of considerable breadth. If necessary, the agents of the present invention may also be employed in conjunction with other known brightening agents as well as with leveling agents, porosity-prevention agents, hardness binding agents, inhibitors, wetting agents, conductive salts, etc. All types of metals previously customarily used for this purpose may be used as metal substrates to be electroplated, such as iron, steel, zinc, copper, nickel, and other non-precious metals or metal alloys. If necessary, the non-precious metals are first provided with a thin copper deposit in a cyanide bath in customary fashion.

Metal electrodeposits which adhere very firmly and have good brightness are obtained with the agents according to this invention. In addition, the agents according to the invention have the advantage that they are satisfactorily chemically stable in the various electroplating baths, so that these baths remain operative for long periods of time.

The products according to the present invention may also be used in the direct copper electroplating process in which firmly adhering copper deposits are applied without preliminary copper plating in a cyanide bath on non-precious metals, such as iron, by subjecting the metal objects to be copper-plated to a preliminary treatment in an acid pickling bath modified with inhibitors having a high inhibiting effect and subsequently directly electroplating these objects without intermediate rinsing in an acid copper bath.

To the extent that the products according to the present invention are difficultly soluble, they may aso be employed with advantage as constant release additives in self-controlling electroplating baths; for this purpose they are advantageously introduced into a solution filter which is inserted downstream from the customary impurities trap filter. Because of the effect of the wetting agents which are customarily used in conjunction therewith, such baths can be considered as needing practically no surveillance over a very broad range of concentrations of wetting agent as well as because of the self-replenishment of the brightening agent from the controlled release additive lying at the bottom of the cell.

The following specific examples are presented to illustrate the invention and to enable persons skilled in the art to better understand and practice the invention and are not intended to be limitative.

Specific examples of Group I compounds are as follows:

Example I

The disodium salt of S-octyl-thiolothionophosphoric acid (compound No. 2 above) was added to an acid copper electroplating bath which contained per liter 60 gm. of sulfuric acid, 210 gm of copper sulfate and 8 gm. of an addition product of 8 mols of ethylene oxide to 1 mol of a coconut fatty alcohol mixture $C_{12}$–$C_{18}$ as a wetting agent dissolved therein. When 70 mgm./l. of bath fluid of this compound were added semibright, firmly adhering, high-leveled copper electrodeposits of good ductility are obtained in a current density range of 0.25 to 8 amp/dm.$^2$.

Example II

When a cyanide copper bath composed of 30 gm./l. of cadmium oxide, 110 gm./l. of sodium cyanide, 1 gm./l. of potassium nickel cyanide and 1.5 gm./l. of a sulfated fatty alcohol polyglycol ether is modified with 1 gm./l. of disodium salt of O-ethyl-dithiolothionophosphoric acid (compound No. 3) as a brightening agent, full bright electrodeposits which require no further treatment are obtained at room temperature in a current density range of 0.5 to 5 amp/dm.$^2$.

Example III

The sodium salt of O-phenyl-thionophosphoric acid monoamide (compound No. 6) was added as a brightening agent to a cyanide zinc bath containing per liter of bath fluid 56.5 gm. of zinc cyanide, 71.5 gm. of sodium hydroxide and 40.3 gm. of sodium cyanide. When 2 gm./l. of bath fluid of this sodium salt were used, firmly adhering ductile zinc electrodeposits having an attractive uniform brightness were obtained in a current density range of 0.5 to 4 amp/dm.$^2$.

Example IV 0.1 to 0.2 gm. of phenylthionophosphoric acid diamide (compound No. 9) was added per liter of bath fluid as a brightening agent to a cyanide brass electroplating bath which contained per liter 21 gm. of copper-(I)-cyanide, 53.8 gm. of zinc cyanide, 75 gm. of sodium cyanide and 20 gm. of anhydrous sodium carbonate. At a bath temperature of 30° C. and in a current density range of 0.25 to 2.5 amp./dm.$^2$ this bath furnished a uniform, spot-free, yellow brass electroplate.

Example V 0.5 gm. of O-phenyl-thiophosphoric acid dimorpholide (compound No. 11) per liter of bath fluid were added as a brightening agent to a cyanide copper bath composed of 105 gm./l. of copper-I-cyanide, 128 gm./l. of sodium cyanide and 30 gm./l. of sodium hydroxide. At a bath temperature of 70 to 80° C. this bath furnished full bright, firmly adhering and ductile copper electrodeposits in a high current density range of 3 to 5 amp/dm.$^2$.

Example VI

When sheet steel was electroplated at room temperature at a current density of 4 to 9 amp/dm.$^2$ in an acid zinc bath containing per liter 200 gm. of zinc sulfate, 1 gm. of glacial acetic acid and, as a brightening agent, 1 gm. of diammonium salt of S-benzyl-tetrathiophosphoric acid (compound No. 4), satisfactorily bright and firmly adhering zinc electrodeposits were obtained.

Example VII

When 0.5 to 1.5 gm./l. of sodium salt of phenyltrithiophosphonic acid (compound No. 8) was added as a brightening agent to a cyanide cadimum bath composed of 30 gm./l. of cadmium oxide and 110 gm./l. of sodium cyanide, this bath furnished full bright electrodeposits which would not require any subsequent treatment at room temperature in a current density range of 0.5 to 5 amp/dm.$^2$, even without the presence of nickel ions.

Example VIII 0.1 gm. of disodium salt of O-butyl-thionophosphoric acid (compound No. 1) was added per liter of bath fluid as a brightening agent to a nickel bath composed of 265 gm./l. of nickel sulfate, 53 gm./l. of nickel chloride and 33 gm./l. of boric acid. At a bath temperature of 55° C. and in a current density range of 1 to 10 amp/dm.$^2$ this bath produced satisfactorily bright, firmly adhering and very ductile nickel electrodeposits whose ductility also remained preserved even upon overdosage of the brightening additive.

Example IX 0.2 gm. of O-phenylthionophosphoric acid diamide (compound No. 5) was added per liter of bath fluid as a brightening agent to a copper-cadmium-bronze-bath which contained per liter 23 gm. of copper-(I)-cyanide, 1.2 gm. of cadmium oxide, 34 gm. of sodium cyanide and 15 gm. of sodium carbonate. At a bath temperature of 20 to 35° C. and in a current density range of 0.1 to 1.5 amp/dm.$^2$, uniform, firmly adhering, satisfactorily bright, bronze-colored electrodeposits were obtained.

Example X

When 0.1 gm./l. of N,N-pentamethylene amidothionophosphoric acid diamide (compound No. 10) was added as a brightening agent to a nickel bath having the composition described in Example VIII, satisfactorily bright, firmly adhering and ductile nickle electrodeposits were obtained at a bath temperature of 55° C. in a current density range of 1 to 10 amp/dm.$^2$; the brightness of these electrodeposits could be further increased by a combination with 1 gm. of N-(benzenesulfonyl)-benzyl amide per liter of bath fluid.

Example XI 10 mgm./l. of bath fluid of the disodium salt of phenylthionophosphonic acid (compound No. 7) were added to an acid copper electroplating bath having the same combination as that in Example I. The bath furnished firmly adhering, bright copper electrodeposits with a very fine grain in a current density range of 1 to 6 amp/dm.$^2$.

Specific examples of Group II compounds are as follows:

Example XII

The disodium salt of O-butyl-thionophosphoric acid bis-(sulfopropylester) (compound No. 12) was added as a brightening agent to an acid copper bath comprising per liter 60 gm. of sulfonic acid, 210 gm. of copper sulfate and 8 gm. of an addition product of 8 moles of ethyleneoxide to 1 mol of a coconut fatty alcohol mixture $C_{12}$–$C_{18}$ as a wetting agent dissolved therein. This salt was obtained by adding dropwise at room temperature 20.7 gm. of butylthionophosphoric acid dichloride (prepared according to Pistschimuka, Ber. 41, p. 3854, or Zentralblatt 1913 I, p. 1581) to a solution of 8 gm. of sodium hydroxide in 8 gm. of water and 200 gm. of absolute ethanol, accompanied by stirring, and maintaining the temperature at about 20° C. by occasional cooling. After filtering off the sodium chloride which separated out, the filtrate was admixed with additional 8 gm. of sodium hydroxide dissolved in 15 gm. of water, heated to 65–70° C., and adding 24.4 gm. of propanesultone thereto. Subsequently, the mixture was reflected for 2 hours while stirring. By evaporation in vacuo, 53.8 gm. of raw product were obtained, which was recrystallized from a mixture of ethanol and methanol to form a colorless crystalline powder.

When 30 to 200 mgm./l. of bath fluid of this compound were used, full bright, firmly adhering copper electrodeposits were obtained in a current density range of 0.25 to 8 amp/dm.$^2$ which did not require any further treatment after rinsing.

Example XIII

The disodium salt of O-nonylphenyl-thionophosphoric acid bis-(sulfopropylester) (compound No. 13) was added as a brightening agent to an acid copper bath having the base composition described in Example I. This salt was obtained when an ethanolic solution of 7.92 gm. of nonyl-phenyl-thionophosphoric acid (produced analogous to Autenrieth and Hildebrandt Ber. 31, pp. 1054–1111, 1898) was admixed with 2 gm. of sodium hydroxide dissolved in 7 gm. of water and 70 gm. of ethanol, the mixture was heated on a steam bath, and an ethanolic solution of 6.1 gm. of propane-sultone was added to the mixture. The alcohol was slowly allowed to evaporate; the initially strongly alkaline solution thereby became neutral. The raw product obtained by evaporation was triturated in a mixture of ethanol and acetone, and after addition of ether the mixture was vigorously stirred for some time. Thereafter, the solid substance was filtered off and dried.

When 20 to 100 mgm./l. of bath fluid of this compound were used, full bright, firmly adhering and satisfactorily leveled copper electrodeposits were obtained in a current density range of 0.25 to 8 amp/dm.$^2$.

The same result was achieved when the disodium salt of S-phenyl-thiolothionophosphoric acid bis-(sulfopropyl-ester) (compound No. 15) or the disodium salt of O-phenyldithiolothionophosphoric acid - bis - (sulfopropyl-ester) (compound No. 16) were used as brightening agents in equal amounts.

Example XIV

The dipotassium salt of phenyl-thionophosphonic acid-bis-(sulfopropylester) (compound No. 14) was added as a brightening agent to an acid copperfluoroborate bath which contained 420 gm./l. of copper-(I)-fluoroborate and 8 gm./l. of an addition product of 8 mols of ethylene oxide to 1 mol of a coconut fatty alcohol mixture $C_{12}$–$C_{18}$ as a wetting agent. This salt was prepared by the following method: The solution of 26.9 gm. of the potassium salt of phenyl-thionophosphonic acid (prepared analogous to Autenrieth and Hildebrandt, Ber. 31, pp. 1054–1111, 1898) in 150 cc. of absolute ethanol was admixed at 65–70° C. within a period of 7 minutes with 26.3 gm. of propane sultone. In the course of the exothermic reaction, the reaction product precipitated out. The reaction mixture was stirred for about 2 hours more at 65–70° C., strongly diluted with ether, and the precipitate was filtered off. 27.2 gm. of a colorless powder were obtained whose analysis gave the following values:

Carbon—found 29.6%, calculated 29.2%;
Hydrogen—found 4.9%, calculated 3.4%;
Sulfur—found 19.3%, calculated 19.4%.

When 5 to 15 mgm./l. of bath fluid of this salt were added, a uniform full brightness of the copper electrodeposits were simultaneously good leveling effect was obtained in a current density range of 0.5 to 8 amp/dm.$^2$ at a bath temperature of 35° C.

Example XV

When sheet steel was electroplated at room temperature in a current density of 4 to 9 amp/dm.$^2$ in an acid zinc bath containing per liter 200 gm. of zinc sulfate, 1 gm. of glacial acedic acid, and as a brightening agent 1 gm. of disodium salt of S-benzyl-tetrathiophosphoric acid bis-(sulfopropylester) (compound No. 17), a full bright, firmly adhering zinc electrodeposit was obtained which did not require any subsequent pickling treatment.

Example XVI

ω-Disodium sulfopropyl-thionophosphoric acid anilide (compound No. 28) was added as a brightening agent in an amount of 10–100 mgm./l. of bath fluid to an acid copper bath having the same base composition as that in Example XII. In a current density range of 0.25 to 8 amp/dm.$^2$ full bright, firmly adhering and satisfactorily leveled copper electroplates were obtained.

Example XVII

When 1 to 5 mgm./l. of bath fluid of the disodium salt of the sulfate of the addition product of 3 mols of ethylene oxide to one mol of p-chloro-phenyl-thionophosphoric acid (compound No. 19) were added as a brightening agent to an acid copper bath having the same composition as in Example XII, full bright, firmly adhering and distinctly leveled copper electrodeposits were obtained in a current density range of 0.5 to 8 amp/dm.$^2$. The leveling effect can be further intensified by the addition of 1 to 2 mgm./l. of the sodium salt of N-phenyl-N'-carboxymethylthiourea.

Compound No. 19 was obtained by dissolving 17.8 gm. of the addition product of 3 mols ethyleneoxide to 1 mol of p-chlorophenylthionophosphoric acid in 150 cc. of chloroform and adding dropwise to this solution at 0 to 8° C. a solution of 12 gm. of chlorosulfonic acid in 15 cc. of chloroform. The mixture was stirred for three and a half hours more, whereby the hydrogen chloride formed during the reaction escaped. After neutralization with 50.4 gm. of 10% sodium hydroxide, the solution was evaporated in vacuo, the greasy residue was extracted with hot ethanol, the ethanol extraction solution was filtered, again evaporated, the residue was suspended in water, extracted with ether and the aqueous solution was evaporated. The raw product was triturated under acetone, filtered off and dried in vacuo. 6.9 gm. of a colorless, hygroscopic powder of the indicated composition were obtained.

When an equal amount of the disodium salt of phenylthionophosphonic acid bis-(carboxymethylester) (compound No. 18) was used as a brightening agent, full bright copper electrodeposits were obtained only in the range of higher current densities. Compound No. 18 may be obtained by the following method.

A solution of phenylthionophosphonic acid was prepared from 10.5 gm. of phenylthionophosphonic acid dichloride (prepared analogous to B. Gottlieb, J.A.C.S. 54, p. 750, 1932) by adding the phenylthionophosphonic acid chloride dropwise to a solution of 11.2 gm. of potassium hydroxide in 100 cc. of water, heating the mixture until reflux begins and stirring the mixture for 2 hours under reflux. Thereafter, the solution of 9.5 gm. of chloroacetic acid and 5.6 gm. of potassium hydroxide, each in 25 cc. of water, were added over the course of 11 minutes at 40° C. After 2 hours of stirring at 40° C. the reaction mixture was evaporated in vacuo, the raw product thus obtained was dissolved in ethanol, the ethanol solution was filtered and from the filtrate 10 gm. of a colorless substance having the indicated composition were obtained by cooling; its analysis furnished the following values:

Carbon—found 33.9%, calculated 32.8%;
Hydrogen—found 4.5%, calculated 2.5%;
Sulfur—found 8.5%, calculated 8.7%.

Example XVIII 50 mgm. of O-phenyl-thionophosphoric acid bis-((2-hydroxy)-propylesterpyridinium chloride) (compound No. 20) were added per liter of bath fluid to a nickel bath composed of 265 gm./l. of nickel sulfate, 53 gm./l. of nickel chloride and 33 gm./l. of boric acid, which contained as a brightening agent 2 gm./l. of benzyl-benzoyl-amide. At a bath temperature of 55° C. and in a current density range of 0.5 to 6 amp/dm.$^2$, this bath produced full bright, firmly adhering, ductile and satisfactorily leveled nickel electrodeposits. If 100 gm./l. of bath fluid of O-phenyl-thionophosphoric acid diaminoethylester hydrochloride (compound No. 26) were used in place of the above mentioned additive No. 20, full bright, nickel electrodeposits of good adherence, but somewhat less leveling, were obtained.

*Example XIX*

When 1 gm./l. of bis-(sodium-sulfopropyl)-dithiophosphinic acid phenylester (compound No. 25) was added as a brightening agent to a cyanide cadmium bath composed of 30 gm./l. of cadmium oxide, 110 gm./l. of sodium cyanide, 1 gm./l. of potassium nickel cyanide and 1.5 gm./l. of a sulfated fatty alcohol polyglycolether, full brightness was obtained in a current density range of 0.5 to 4 amp/dm.$^2$. Subsequent pickling in a slightly oxidizing medium was not necessary.

The same result was obtained when an equal amount of bis-(sodium-sulfopropyl)-thionophosphinic acid phenylester (compound No. 23) was used as the brightening agent.

*Example XX*

When 1 to 20 mgm./l. of bath fluid of O-phenylthionophosphoric acid bis-(benzylester-o-sodium sulfonate) (compound No. 22) were added as a brightening agent to an acid copper bath having the base composition described in Example XII, full bright, smooth and firmly adhering copper electrodeposits of good ductility were obtained in a current density range of 0.25 to 5 amp/dm.$^2$.

*Example XXI*

1 gm./l. of bath fluid of the tetrasodium salt of O-phenylthionophosphoric acid bis - (methylesterphosphate) (compound No. 24) was added as a brightening agent to a cyanide copper bath containing per liter 81.7 gm. of copper-(I)-cyanide, 118.3 gm. of potassium cyanide, 10 gm. of Rochelle salt, 15 gm. of sodium cyanide, 20 gm. of sodium hydroxide and 55 gm. of sodium carbonate. At a bath temperature of 75 to 80° C. and over the entire current density range of 0.5 to 8 amp/dm.$^2$, this bath furnished satisfactorily bright, very fine-grained copper electrodeposits.

*Example XXII*

0.2 gm./l. of bath fluid of the addition product of 3 mols of ethylene oxide to 1 mol of phenylthionophosphoric acid (compound No. 21) was added as a brightening agent to a cyanide brass electroplating bath containing per liter 21 gm. of copper-(I)-cyanide, 53.8 gm. of zinc cyanide, 75 gm. of sodium cyanide and 20 gm. of anhydrous sodium carbonate. At a bath temperature of 30° C. and in a current density range of 0.25 to 2.5 amp/dm.$^2$, this bath furnished a completely uniform, spot-free, satisfactorily bright, yellow brass electrodeposit.

*Example XXIII*

When 10–50 mgm./l. of bath fluid of bis-(sodium sulfopropyl)-phenyl-phosphinic sulfide (compound No. 27) were added as a brightening agent to an acid copper bath having the base composition described in Example XII, full bright copper electrodeposits of good ductility were obtained in a current density range of 1 to 6 amp/dm.$^2$.

Specific examples of Group III compounds are as follows:

*Example XXIV*

Thionophosphoric acid tris-(propylester-ω-sodium-sulfate) (compound No. 29) was added as a brightening agent to an acid copper bath which contained per liter 60 gm. of sulfuric acid, 210 gm. of copper sulfate, and 8 gm. of an addition product of 8 mols of ethylene oxide to 1 mol of a coconut fatty alcohol mixture $C_{12}$–$C_{18}$ dissolved therein as a wetting agent. This salt was obtained by dissolving 36 gm. of sodium thionophosphate (PS(ONa)$_3$·H$_2$O) in 100 cc. of water and adding to this solution 36.6 gm. of molten propanesultone dropwise at 60–70° C. This mixture was stirred for 4 hours at 65–70° C., filtered, the filtrate was evaporated in vacuo, and the somewhat greasy substance thus obtained was triturated under alcohol, whereby a colorless powder having the structure indicated in Formula No. 29 was obtained in an amount of 45.4 gm.

When 50 to 500 mgm./l. of bath fluid of this compound were used, full bright, firmly adhering copper electrodeposits which did not require any further treatment after rinse were obtained in a current density range of 0.25 to 8 amp/dm.$^2$.

*Example XXV*

When sheet steel was electroplated at room temperature at a current density of 4 to 9 amp/dm.$^2$ in an acid zinc bath comprising per liter 200 gm. of zinc sulfate, 1 gm. of glacial acetic acid, and as a brightening agent 1 gm. of thionophosphoric acid tris-(benzylester-p-sodiumsulfonate) (compound No. 31), satisfactorily bright, firmly adhering zinc electrodeposits were obtained which required no subsequent treatment.

The salt according to the present invention was obtained by dissolving 32.4 gm. of sodium thionophosphate and 68.6 gm. of p-chlorobenzylsulfonate in 300 cc. of water and stirring the resulting solution at 65–70° C. for 5 hours. After evaporation in vacuo and drying, 87.2 gm. of raw product were obtained which, after recrystallization from aqueous alcohol, yielded 18 gm. of a crystallized substance having the structure indicated under No. 31.

*Example XXVI*

100 mgm./l. of thionophosphoric acid tris-(benzylester-o-sodium-sulfonate) (compound No. 32) were added to a nickel bath composed of 265 gm./l. of nickel sulfate, 53 gm./l. of nickel chloride and 33 gm./l. of boric acid, which contained 2 gm./l. of benzyl-benzoylamide as a base brightening agent. At a bath temperature of 55° C. and in a current density range of 0.5 to 6 amp/dm.$^2$, this bath produced satisfactorily bright, firmly adhering, ductile and leveled nickel electrodeposits.

*Example XXVII*

When 1 gm./l. of thionophosphoric acid tris-((2-hydroxy)-propylester-ω-sodium-sulfonate) (compound No. 30) was added as a brightening agent to a cyanide cadmium bath composed of 30 gm./l. of cadmium oxide, 110 gm./l. of sodium cyanide, 1 gm./l. of cadmium nickel cyanide and 1.5 gm./l. of a sulfated fatty alcohol polyglycolether, full brightness was obtained in a current density range of 0.5 to 5 amp/dm.$^2$. A subsequent pickling treatment in a weakly oxidizing medium was not necessary.

*Example XXVIII*

1 gm./l. of bath fluid of thionophosphoric acid tris-(methylester-potassium carboxylate) (compound No. 35) was added as a brightening agent to a cyanide copper bath containing per liter 81.7 gm. of copper (I) cyanide, 118.3 gm. of potassium cyanide, 10 gm. of Rochelle salt, 15 gm. of sodium cyanide, 20 gm. of sodium hydroxide and 55 gm. of sodium carbonate. This salt was obtained by dissolving 36 gm. of sodium thionophosphate in 100 cc. of water and admixing this solution with a solution of 28.4 gm. of chloroacetic acid and 16.8 gm. of potassium hydroxide in 150 cc. of water at 28° C. Thereafter, the mixture was stirred for 4 hours at 40° C. and the solution was evaporated in vacuo. The raw product thus obtained was purified by treatment with a small amount of water containing ethanol, whereby the product according to the invention remained as an insoluble residue in an amount of 16 gm. At a bath temperature of 75–80° C. and over the entire current density range of 0.5 to 8 amp/dm.² this bath furnished satisfactorily bright, very fine-grained copper electrodeposits.

*Example XXIX*

500 mgm./l. of bath fluid of tris-(ω-sodium sulfopropyl)-phosphinic sulfide (compound No. 37) were added as a brightening agent to an alkaline cyanide brass electroplating bath which contained per liter 21 gm. of copper (I) cyanide, 53.8 gm. of zinc cyanide, 75 gm. of sodium cyanide and 20 gm. of anhydrous sodium carbonate. At a bath temperature of 30° C. and in a current density range of 0.25 to 2.5 amp/dm.² this bath furnished uniform, spot-free, satisfactorily bright, yellow brass electrodeposits.

The salt according to the present invention was obtained by reacting 17 gm. of phosphine with 183 gm. of propane sultone in benzene solution at about 75° C. in the presence of acid binding agents, such as sodium in fine suspension. The mixture was then stirred for one hour under reflux and the reaction product thus obtained was sulfurized by introducing 16 gm. of finely powdered sulfur at the reflux temperature in known fashion. The mixture was then allowed to reflux for 2 additional hours while stirring, evaporated in vacuo, the residue was taken up in water and the aqueous solution was extracted with ether. The aqueous phase contained the product having the above indicated composition.

*Example XXX*

Thionophosphoric acid tris - (ω - sodium - sulfopropylamide) (compound No. 36) was added as a brightening agent to the acid copper bath having the base composition indicated in Example XXIV. This salt was obtained by adding 16 gm. of pyridine to an aqueous solution of 32.2 gm. of 3-aminopropane-1-sodium-sulfonate, heating the solution to 60° C. and then adding 113 gm. of phosphorus sulfochloride (PSCl₃) dropwise over a period of 20 minutes. The reaction was exothermic. The mixture was stirred for two and a half hours at 60-65° C., evaporated in vacuo, the residue was dissolved in a small amount of water and the aqueous solution was admixed with ethanol. The reaction product separated out at the bottom as a viscous substance. After decanting, drying, triturating under alcohol and filtering off the solid substance, 21.2 gm. of the substance according to the invention were obtained. When 20 to 200 mgm./l. of bath fluid of this compound were used, full bright, firmly adhering and ductile copper electrodeposits were obtained in a current density range of 0.25 to 8 amp/dm.².

When an equal amount of tetrathiophosphoric acid tris-(propylester-ω-sodium sulfonate) (compound No. 34) was used as a brightening agent, satisfactorily bright, copper electrodeposits were obtained primarily in the range of higher current densities.

While certain specific examples and preferred modes of practice of the invention have been set forth it will be understood that this is solely for the purpose of illustration and that various changes and modifications may be made without departing from the spirit of the disclosure and the scope of the appended claims.

We claim:

1. Electroplating baths for obtaining bright level electrodeposits of metals selected from the group consisting of copper, brass, bronze, zinc, cadmium, silver and nickle, comprising in aqueous solution a compound of the metal to be electrodesposited and as an additive a compound having a formula selected from the group consisting of

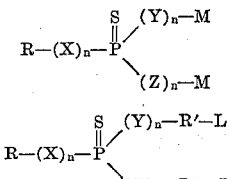

and

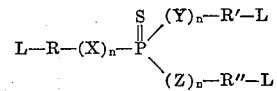

wherein R, R' and R" are selected from the group consisting of aliphatic, cycloaliphatic, aromatic and araliphatic radicals, X, Y, and Z are heteroatoms selected from the group consisting of O, S and NH, L is a water-solubilizing group, $n$ is an integer from 0 to 1, and M is selected from the group consisting of hydrogen, metals and organic bases, said additive compound being added in sufficient amount to obtain bright, level electrodeposits.

2. A method for obtaining bright, level electrodeposits of metals selected from the group consisting of copper, brass, bronze, zinc, cadmium, silver and nickel which comprises electrodepositing said metals from an aqueous solution comprising a compound of the metal to be electrodeposited and as an additive a compound having a formula selected from the group consisting of

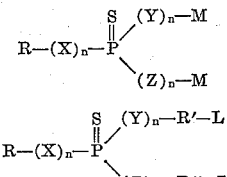

and

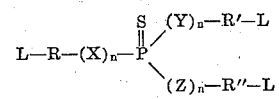

wherein R, R' and R" are selected from the group consisting of aliphatic, cycloaliphatic, aromatic and araliphatic radicals, X, Y and Z are heteroatoms selected from the group consisting of O, S and NH, L is a water solubilizing group, $n$ is an integer from 0 to 1, and M is selected from the group consisting of hydrogen, metals and organic bases, said additive compound being added in sufficient amount to obtain bright, level electrodeposits.

3. The bath of claim 1, wherein the amount of additive compound is 0.001 to 20 gm./l. of bath.

4. Electroplating baths according to claim 1, characterized in that other brightening agents, known poreprevention agents, hardness binders, inhibitors and wetting agents are used concurrently.

5. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the general formula

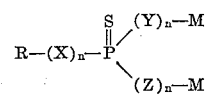

wherein R is a member selected from the group consisting of aliphatic, cycloaliphatic, aromatic and araliphatic radicals X, Y and Z are heteroatom groups selected from the group consisting of O, S and NH, M is a member selected from the group consisting of hydrogen, metals and organic bases, $n$ is a number from 0 to 1, said additive compound being added in sufficient amount to obtain said bright, level electrodeposits.

6. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the general formula

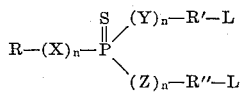

wherein R, R′ and R″ represents members selected from the group consisting of aliphatic, cycloaliphatic, aromatic and araliphatic radicals, X, Y and Z are heteroatom groups selected from the group consisting of O, S and NH, L represents a water-solubilizing group, $n$ is a number from 0 to 1, said additive compound being added in sufficient amount to obtain bright, level electrodeposits.

7. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the general formula

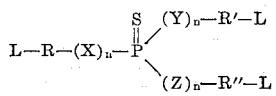

wherein R, R′ and R″ represent members selected from the group consisting of aliphatic, cycloaliphatic, aromatic and araliphatic radicals, X, Y and Z are heteroatom groups selected from the group consisting of O, S and NH, L represents a water-solubilizing group, $n$ is a number from 0 to 1, said additive compound being added in sufficient amount to obtain said bright, level electrodeposits.

8. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula

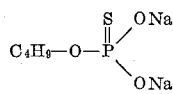

said additive compound being added in sufficient amount to obtain said bright, level electrodeposits.

9. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula

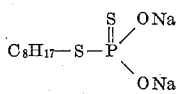

said additive compound being added in sufficient amount to obtain said bright, level electrodeposits.

10. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula

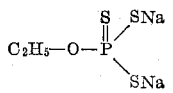

said additive compound being added in sufficient amount to obtain said bright, level electrodeposits.

11. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula

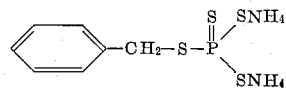

said additive compound being added in sufficient amount to obtain said bright, level electrodeposits.

12. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula

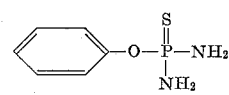

said additive compound being added in sufficient amount to obtain said bright, level electrodeposits.

13. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula

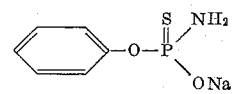

said additive compound being added in sufficient amount to obtain said bright, level electrodeposits.

14. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula

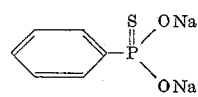

said additive compound being added in sufficient amount to obtain said bright, level electrodeposits.

15. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula

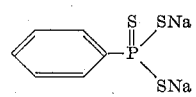

said additive compound being added in sufficient amount to obtain said bright, level electrodeposits.

16. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula

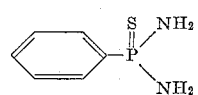

said additive compound being added in sufficient amount to obtain said bright, level electrodeposits.

17. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{C}_6\text{H}_5\text{-N(H)-P(=S)(NH}_2\text{)}_2$$

said additive compound being added in sufficient amount to obtain said bright, level electrodeposits.

18. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{C}_6\text{H}_5\text{-O-P(=S)(morpholino)}_2$$

said additive compound being added in sufficient amount to obtain said bright, level electrodeposits.

19. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{C}_4\text{H}_9\text{-O-P(=S)(O-(CH}_2)_3\text{-SO}_3\text{Na)}_2$$

said additive compound being added in sufficient amount to obtain said bright, level electrodeposits.

20. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{C}_9\text{H}_{19}\text{-C}_6\text{H}_4\text{-O-P(=S)(O-(CH}_2)_3\text{-SO}_3\text{Na)}_2$$

said additive compound being added in sufficient amount to obtain said bright, level electrodeposits.

21. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{C}_6\text{H}_5\text{-P(=S)(O-(CH}_2)_3\text{-SO}_3\text{K)}_2$$

said additive compound being added in sufficient amount to obtain said bright, level electrodeposits.

22. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{C}_6\text{H}_5\text{-S-P(=S)(O-(CH}_2)_3\text{-SO}_3\text{Na)}_2$$

said additive compound being added in sufficient amount to obtain said bright, level electrodeposits.

23. Electroplating baths for obtaining bright, level electrodeposits of metal selected from the group consisting of copper, brass, bronze, zinc, cadmium, silver and nickel, comprising in aqueous solution a compound of the metal to be electrodeposited and an additive compound of the formula $$\text{C}_6\text{H}_5\text{-O-P(=S)(S-(CH}_2)_3\text{-SO}_3\text{Na)}_2$$

said additive compound being added in sufficient amount to obtain said bright, level electrodeposits.

24. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{C}_6\text{H}_5\text{-CH}_2\text{-S-P(=S)(S-(CH}_2)_3\text{-SO}_3\text{Na)}_2$$

said additive compound being added in sufficient amount to obtain said bright, level electrodeposits.

25. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{C}_6\text{H}_5\text{-P(=S)(O-CH}_2\text{-COONa)}_2$$

said additive compound being added in sufficient amount to obtain said bright, level electrodeposits.

26. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound, which additive compound is the disodium salt of the sulfate of the condensation product of 3 moles of ethylene oxide with 1 mole of p-chlorophenyl thionophosphonic acid, said additive compound being added in sufficient amount to obtain said bright, level electrodeposits.

27. Electroplating baths for obtaining bright, level electrodeposits of metals selected from the group consisting of copper, brass, bronze, zinc, cadmium, silver and nickel, comprising in aqueous solution a compund of the metal to be electrodeposited and an additive compound of the formula $$\text{C}_6\text{H}_5\text{-O-P(=S)(O-CH}_2\text{-CH(OH)-CH}_2\text{-N}^+\text{C}_5\text{H}_5\text{ Cl}^-)_2$$

said additive compound being added in sufficient amount to obtain said bright, level electrodeposits.

28. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound, which additive compound is the condensation product of 3 moles of ethylene oxide with 1 mole of phenylthionophosphonic acid, said additive compound being added in sufficient amount to obtain said bright, level electrodeposits.

29. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{C}_6\text{H}_5-\text{O}-\overset{\overset{\text{S}}{\|}}{\text{P}}\begin{pmatrix}\text{O}-\text{CH}_2-\text{C}_6\text{H}_4-\text{SO}_3\text{Na}\\ \text{O}-\text{CH}_2-\text{C}_6\text{H}_4-\text{SO}_3\text{Na}\end{pmatrix}$$

said additive compound being added in sufficient amount to obtain said bright, level electrodeposits.

30. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{C}_6\text{H}_5-\text{O}-\overset{\overset{\text{S}}{\|}}{\text{P}}\begin{pmatrix}(\text{CH}_2)_3-\text{SO}_3\text{Na}\\ (\text{CH}_2)_3-\text{SO}_3\text{Na}\end{pmatrix}$$

said additive compound being added in sufficient amount to obtain said bright, level electrodeposits.

31. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{C}_6\text{H}_5-\text{O}-\overset{\overset{\text{S}}{\|}}{\text{P}}\begin{pmatrix}\text{O}-\text{CH}_2\text{O}-\text{PO}_3\text{Na}_2\\ \text{O}-\text{CH}_2\text{O}-\text{PO}_3\text{Na}_2\end{pmatrix}$$

said additive compound being added in sufficient amount to obtain said bright, level electrodeposits.

32. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{C}_6\text{H}_5-\text{S}-\overset{\overset{\text{S}}{\|}}{\text{P}}\begin{pmatrix}(\text{CH}_2)_3-\text{SO}_3\text{Na}\\ (\text{CH}_2)_3-\text{SO}_3\text{Na}\end{pmatrix}$$

said additive compound being added in sufficient amount to obtain said bright, level electrodeposits.

33. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{C}_6\text{H}_5-\text{O}-\overset{\overset{\text{S}}{\|}}{\text{P}}\begin{pmatrix}\text{O}-\text{CH}_2-\text{CH}_2-\text{NH}_2\cdot\text{HCl}\\ \text{O}-\text{CH}_2-\text{CH}_2-\text{NH}_2\cdot\text{HCl}\end{pmatrix}$$

said additive compound being added in sufficient amount to obtain said bright, level electrodeposits.

34. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{C}_6\text{H}_5-\overset{\overset{\text{S}}{\|}}{\text{P}}\begin{pmatrix}(\text{CH}_2)_3-\text{SO}_3\text{Na}\\ (\text{CH}_2)_3-\text{SO}_3\text{Na}\end{pmatrix}$$

said additive compound being added in sufficient amount to obtain said bright, level electrodeposits.

35. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{C}_6\text{H}_5-\text{NH}-\overset{\overset{\text{S}}{\|}}{\text{P}}\begin{pmatrix}\text{O}-(\text{CH}_2)_3-\text{SO}_3\text{Na}\\ \text{O}-(\text{CH}_2)_3-\text{SO}_3\text{Na}\end{pmatrix}$$

said additive compound being added in sufficient amount to obtain said bright, level electrodeposits.

36. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{NaSO}_3-(\text{CH}_2)_3-\text{O}-\overset{\overset{\text{S}}{\|}}{\text{P}}\begin{pmatrix}\text{O}-(\text{CH}_2)_3-\text{SO}_3\text{Na}\\ \text{O}-(\text{CH}_2)_3-\text{SO}_3\text{Na}\end{pmatrix}$$

said additive compound being added in sufficient amount to obtain said bright, level electrodeposits.

37. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{NaSO}_3-\text{CH}_2-\underset{\underset{\text{OH}}{|}}{\text{CH}}-\text{CH}_2-\text{O}-\overset{\overset{\text{S}}{\|}}{\text{P}}\begin{pmatrix}\text{O}-\text{CH}_2-\underset{\underset{\text{OH}}{|}}{\text{CH}}-\text{CH}_2-\text{SO}_3\text{Na}\\ \text{O}-\text{CH}_2-\underset{\underset{\text{OH}}{|}}{\text{CH}}-\text{CH}_2-\text{SO}_3\text{Na}\end{pmatrix}$$

said additive compound being added in sufficient amount to obtain said bright, level electrodeposits.

38. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{NaSO}_3-\text{C}_6\text{H}_4-\text{CH}_2-\text{O}-\overset{\overset{\text{S}}{\|}}{\text{P}}\begin{pmatrix}\text{O}-\text{CH}_2-\text{C}_6\text{H}_4-\text{SO}_3\text{Na}\\ \text{O}-\text{CH}_2-\text{C}_6\text{H}_4-\text{SO}_3\text{Na}\end{pmatrix}$$

said additive compound being added in sufficient amount to obtain said bright, level electrodeposits.

39. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula $$\text{(SO}_3\text{Na)}\text{C}_6\text{H}_4-\text{CH}_2-\text{O}-\overset{\overset{\text{S}}{\|}}{\text{P}}\begin{pmatrix}\text{O}-\text{CH}_2-\text{C}_6\text{H}_4-\text{SO}_3\text{Na}\\ \text{O}-\text{CH}_2-\text{C}_6\text{H}_4-\text{SO}_3\text{Na}\end{pmatrix}$$

said additive compound being added in sufficient amount to obtain said bright, level electrodeposits.

40. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula

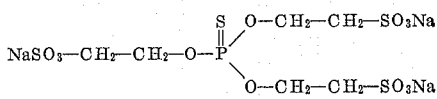

said additive compound being added in sufficient amount to obtain said bright, level electrodeposits.

41. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula

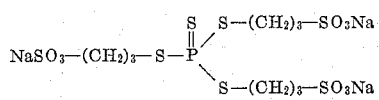

said additive compound being added in sufficient amount to obtain said bright, level electrodeposits.

42. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula

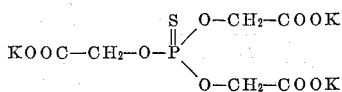

said additive compound being added in sufficient amount to obtain said bright, level electrodeposits.

43. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula

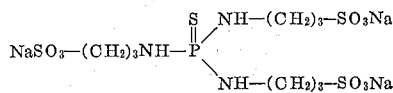

said additive compound being added in sufficient amount to obtain said bright, level electrodeposits.

44. Electroplating baths for obtaining bright, level electrodeposits of metals selected from the group consisting of copper, brass, bronze, zinc, cadmium, silver and nickel, comprising in aqueous solution a compound of the metal to be electrodeposited and an additive compound of the formula

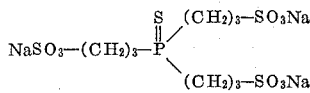

said additive compound being added in sufficient amount to obtain said bright, level electrodeposits.

45. The method of claim 2 wherein the amount of additive compound is 0.001 to 20 gm./l. of bath.

46. The method of claim 2 characterized in that other brightening agents, known pore-prevention agents, hardness binders, inhibitors and wetting agents are used concurrently.

47. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the general formula

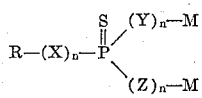

wherein R is a member selected from the group consisting of aliphatic, cycloaliphatic, aromatic and araliphatic radicals, X, Y and Z are heteroatom groups selected from the group consisting of O, S and NH, M is a member selected from the group consisting of hydrogen, metals and organic bases, $n$ is a number from 0 to 1, said additive compound being present in sufficient amount to obtain said bright, level electrodeposits.

48. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the general formula

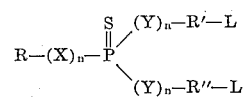

wherein R, R' and R'' represent members selected from the group consisting of aliphatic, cycloaliphatic, aromatic and araliphatic radicals, X, Y and Z are heteroatom groups selected from the group consisting of O, S and NH, L represents a water-solubilizing group, $n$ is a number from 0 to 1, said additive compound being present in sufficient amount to obtain said bright, level electrodeposits.

49. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the general formula

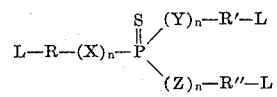

wherein R, R' and R'' represent members selected from the group consisting of aliphatic, cycloaliphatic, aromatic and araliphatic radicals, X, Y and Z are heteroatom groups selected from the group consisting of O, S and NH, L represents a water-solubilizing group, $n$ is a number from 0 to 1, said additive compound being present in sufficient amount to obtain said bright, level electrodeposits.

50. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula

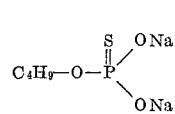

said additive compound being present in sufficient amount to obtain said bright, level electrodeposits.

51. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula

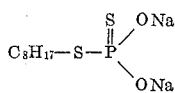

said additive compound being present in sufficient amount to obtain said bright, level electrodeposits.

52. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$C_2H_5-O-\underset{SNa}{\overset{\overset{S}{\|}}{P}}\diagdown SNa$$

said additive compound being present in sufficient amount to obtain said bright, level electrodeposits.

53. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{C}_6\text{H}_5-CH_2-S-\underset{SNH_4}{\overset{\overset{S}{\|}}{P}}\diagdown SNH_4$$

said additive compound being present in sufficient amount to obtain said bright, level electrodeposits.

54. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{C}_6\text{H}_5-O-\underset{NH_2}{\overset{\overset{S}{\|}}{P}}-NH_2$$

said additive compound being present in sufficient amount to obtain said bright, level electrodeposits.

55. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{C}_6\text{H}_5-O-\underset{ONa}{\overset{\overset{S}{\|}}{P}}\diagdown NH_2$$

said additive compound being present in sufficient amount to obtain said bright, level electrodeposits.

56. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{C}_6\text{H}_5-\underset{ONa}{\overset{\overset{S}{\|}}{P}}\diagdown ONa$$

said additive compound being present in sufficient amount to obtain said bright, level electrodeposits.

57. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{C}_6\text{H}_5-\underset{SNa}{\overset{\overset{S}{\|}}{P}}\diagdown SNa$$

said additive compound being present in sufficient amount to obtain said bright, level electrodeposits.

58. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{C}_6\text{H}_5-\underset{NH_2}{\overset{\overset{S}{\|}}{P}}\diagdown NH_2$$

said additive compound being present in sufficient amount to obtain said bright, level electrodeposits.

59. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{C}_5\text{H}_{10}\text{N}-\underset{NH_2}{\overset{\overset{S}{\|}}{P}}\diagdown NH_2$$

said additive compound being present in sufficient amount to obtain said bright, level electrodeposits.

60. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{C}_6\text{H}_5-O-\underset{N(morpholino)}{\overset{\overset{S}{\|}}{P}}\diagdown N(morpholino)$$

said additive compound being present in sufficient amount to obtain said bright, level electrodeposits.

61. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$C_4H_9-O-\underset{O-(CH_2)_3-SO_3Na}{\overset{\overset{S}{\|}}{P}}\diagdown O-(CH_2)_3-SO_3Na$$

said additive compound being present in sufficient amount to obtain said bright, level electrodeposits.

62. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$C_9H_{19}-\text{C}_6\text{H}_4-O-\underset{O-(CH_2)_3-SO_3Na}{\overset{\overset{S}{\|}}{P}}\diagdown O-(CH_2)_3-SO_3Na$$

said additive compound being present in sufficient amount to obtain said bright, level electrodeposits.

63. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula

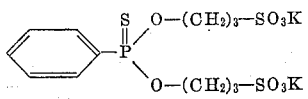

said additive compound being present in sufficient amount to obtain said bright, level electrodeposits.

64. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula

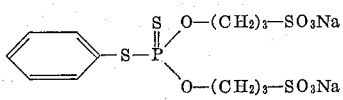

said additive compound being present in sufficient amount to obtain said bright, level electrodeposits.

65. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula

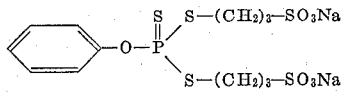

said additive compound being present in sufficient amount to obtain said bright, level electrodeposits.

66. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula

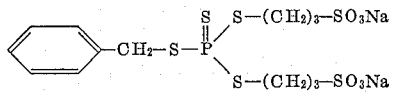

said additive compound being present in sufficient amount to obtain said bright, level electrodeposits.

67. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula

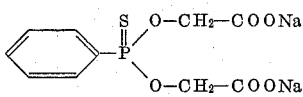

said additive compound being present in sufficient amount to obtain said bright, level electrodeposits.

68. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound, which additive compound is the disodium salt of the sulfate of the condensation product of 3 moles of ethylene oxide with 1 mole of p-chlorophenyl thionophosphonic acid, said additive compound being present in sufficient amount to obtain said bright, level electrodeposits.

69. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula

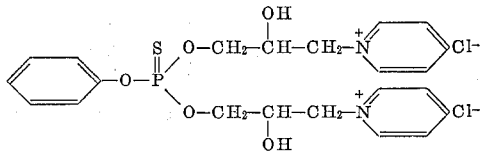

said additive compound being present in sufficient amount to obtain said bright, level electrodeposits.

70. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound, which additive compound is the condensation product of 3 moles of ethylene oxide with 1 mole of phenylthionophosphonic acid, said additive compound being present in sufficient amount to obtain said bright, level electrodeposits.

71. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula

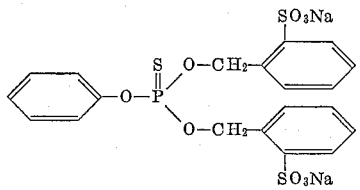

said additive compound being present in sufficient amount to obtain said bright, level electrodeposits.

72. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula

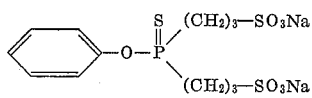

said additive compound being present in sufficient amount to obtain said bright, level electrodeposits.

73. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula

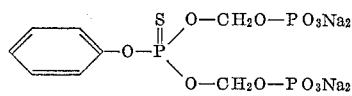

said additive compound being present in sufficient amount to obtain said bright, level electrodeposits.

74. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula

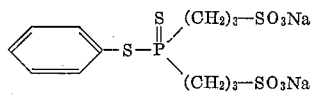

said additive compound being present in sufficient amount to obtain said bright, level electrodeposits.

75. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{C}_6\text{H}_5-\text{O}-\overset{\text{S}}{\underset{\|}{\text{P}}}(\text{O}-\text{CH}_2-\text{CH}_2-\text{NH}_2\cdot\text{HCl})_2$$

said additive compound being present in sufficient amount to obtain said bright, level electrodeposits.

76. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{C}_6\text{H}_5-\overset{\text{S}}{\underset{\|}{\text{P}}}((\text{CH}_2)_3-\text{SO}_3\text{Na})_2$$

said additive compound being present in sufficient amount to obtain said bright, level electrodeposits.

77. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{C}_6\text{H}_5-\text{NH}-\overset{\text{S}}{\underset{\|}{\text{P}}}(\text{O}-(\text{CH}_2)_3-\text{SO}_3\text{Na})_2$$

said additive compound being present in sufficient amount to obtain said bright, level electrodeposits.

78. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{NaSO}_3-(\text{CH}_2)_3-\text{O}-\overset{\text{S}}{\underset{\|}{\text{P}}}(\text{O}-(\text{CH}_2)_3-\text{SO}_3\text{Na})_2$$

said additive compound being present in sufficient amount to obtain said bright, level electrodeposits.

79. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{NaSO}_3-\text{CH}_2-\underset{\text{OH}}{\text{CH}}-\text{CH}_2-\text{O}-\overset{\text{S}}{\underset{\|}{\text{P}}}(\text{O}-\text{CH}_2-\underset{\text{OH}}{\text{CH}}-\text{CH}_2-\text{SO}_3\text{Na})_2$$

said additive compound being present in sufficient amount to obtain said bright, level electrodeposits.

80. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{NaSO}_3-\text{C}_6\text{H}_4-\text{CH}_2-\text{O}-\overset{\text{S}}{\underset{\|}{\text{P}}}(\text{O}-\text{CH}_2-\text{C}_6\text{H}_4-\text{SO}_3\text{Na})_2$$

said additive compound being present in sufficient amount to obtain said bright, level electrodeposits.

81. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$(\text{SO}_3\text{Na})\text{C}_6\text{H}_4-\text{CH}_2-\text{O}-\overset{\text{S}}{\underset{\|}{\text{P}}}(\text{O}-\text{CH}_2-\text{C}_6\text{H}_4(\text{SO}_3\text{Na}))_2$$

said additive compound being present in sufficient amount to obtain said bright, level electrodeposits.

82. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{NaSO}_3-\text{CH}_2-\text{CH}_2-\text{O}-\overset{\text{S}}{\underset{\|}{\text{P}}}(\text{O}-\text{CH}_2-\text{CH}_2-\text{SO}_3\text{Na})_2$$

said additive compound being present in sufficient amount to obtain said bright, level electrodeposits.

83. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{NaSO}_3-(\text{CH}_2)_3-\text{S}-\overset{\text{S}}{\underset{\|}{\text{P}}}(\text{S}-(\text{CH}_2)_3-\text{SO}_3\text{Na})_2$$

said additive compound being present in sufficient amount to obtain said bright, level electrodeposits.

84. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{KOOC}-\text{CH}_2-\text{O}-\overset{\text{S}}{\underset{\|}{\text{P}}}(\text{O}-\text{CH}_2-\text{COOK})_2$$

said additive compound being present in sufficient amount to obtain said bright, level electrodeposits.

85. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula $$\text{NaSO}_3-(\text{CH}_2)_3-\text{NH}-\overset{\text{S}}{\underset{\|}{\text{P}}}(\text{NH}-(\text{CH}_2)_3-\text{SO}_3\text{Na})_2$$

said additive compound being present in sufficient amount to obtain said bright, level electrodeposits.

86. A method for obtaining bright, level electrodeposits of metals selected from the group consisting of copper, brass, bronze, zinc, cadmium, silver and nickel which comprises electrodepositing said metals from an aqueous solution of a compound of the metal to be deposited in the presence of an additive compound of the formula

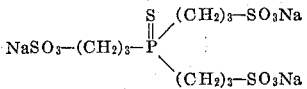

said additive compound being present in sufficient amount to obtain said bright, level electrodeposits.

References Cited by the Examiner
UNITED STATES PATENTS
3,165,513  1/1965  D'Alelio _____ 204—45 X JOHN H. MACK, *Primary Examiner.*

G. KAPLAN, *Assistant Examiner.*